(No Model.)
F. P. MORRISON.
FERTILIZER DISTRIBUTER.
No. 431,608. Patented July 8, 1890.
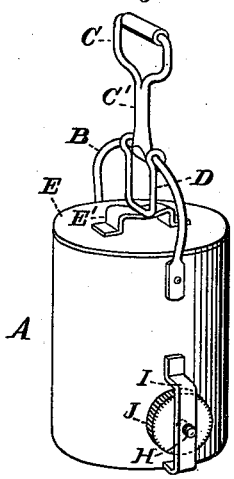
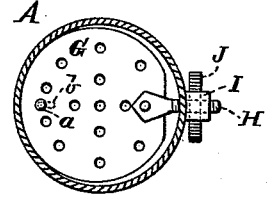
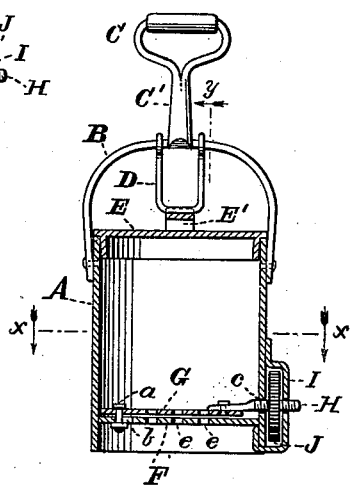
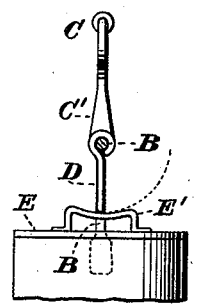
WITNESSES
Villette Anderson,
P. Frank Greenwood
INVENTOR
Franklin P. Morrison
by E. W. Anderson,
Attorney

UNITED STATES PATENT OFFICE.

FRANKLIN P. MORRISON, OF BIG SKIN CREEK, WEST VIRGINIA.

FERTILIZER-DISTRIBUTER.

SPECIFICATION forming part of Letters Patent No. 431,608, dated July 8, 1890.

Application filed March 13, 1890. Serial No. 343,798. (No model.)

*To all whom it may concern:*

Be it known that I, FRANKLIN P. MORRISON, a citizen of the United States, and a resident of Big Skin Creek, in the county of Lewis and State of West Virginia, have invented certain new and useful Improvements in Fertilizer-Distributers; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of my device in perspective with cover in position. Fig. 2 is a vertical section. Fig. 3 is a horizontal section taken where the broken line $xx$ is marked on Fig. 2. Fig. 4 is a detail view, the bail cut where the broken line $y$ is marked on Fig. 2.

My invention relates to certain improvements in fertilizer-distributers, and especially in that class of such articles known as "hand-distributers."

The object of the invention is to provide a device of the character named, which will afford a convenient and effective means of distributing commercial fertilizers, insecticides, &c.

The invention consists in the novel construction and combination of parts, as will be hereinafter fully described and specifically claimed, reference being had to the accompanying drawings.

In the drawings, A represents a receptacle of suitable size and material, provided with the bail B, and handle C, secured to the bail and projecting upward from the middle portion thereof.

D represents a wire loop, pivoted to the bail on each side of the shank C' of the handle in such a manner that when turned downward it will engage the concave spring-handle E' of the cover E of the receptacle, and hold it in position.

F represents the bottom of the receptacle, which is provided with a number of perforations $e$, arranged substantially in the manner shown. Located directly above such perforated bottom, and in contact therewith, is a perforated register G, the perforations of said register being so arranged as to correspond with the perforations in the bottom F when in open adjustment. The register is of a lesser diameter than that of the receptacle in order to provide for its transverse movement therein. It is connected to the perforated bottom by means of a small rivet $a$, which passes loosely through a slot $b$ in the latter, so as to permit of a limited movement of the register.

Secured to one edge of the register G is a stem H, which extends through a perforation $c$ in the wall of the receptacle, and is provided with a screw-thread upon its outer portion, the end of which is mounted in a small bracket or cleat I, secured to the outside of the receptacle. The stem H is provided with a small nut J, mounted in the said bracket and engaging the same, as shown, so that by turning this thumb-nut, which is provided with a milled edge, the register may be moved backward or forward, thereby varying the opening of the perforations and permitting the passage of a greater or less amount of fertilizer for distribution. When not in use, the register may be so adjusted by a reciprocating movement as to entirely close the perforations.

Having thus described my invention, what I claim as new therein, and that for which I desire to secure by Letters Patent, is—

1. In a fertilizer-distributer, the combination, with a receptacle provided with a perforated bottom, of an adjustable reciprocating perforated register located within the said receptacle, a screw-threaded stem of said register passing through the wall of the receptacle, a bracket-bearing, and a thumb-nut engaging the stem and bracket whereby the register may be adjusted, substantially as described.

2. In a fertilizer-distributer, the combination, with a receptacle, its cover, and the concave spring-handle of the latter, of a bail-handle secured to said receptacle, and a pressure-loop pivotally secured to said handle at its middle portion for holding the cover of the receptacle in position, substantially as described.

In testimony whereof I affix my signature in presence of two witnesses.

FRANKLIN P. MORRISON.

Witnesses:
GEO. A. HYER,
M. L. HARDMAN.